(12) United States Patent
Daffue

(10) Patent No.: US 9,724,966 B2
(45) Date of Patent: Aug. 8, 2017

(54) AGRICULTURAL HARVESTER AXLE

(71) Applicant: CNH Industrial America LLC, New Holland, PA (US)

(72) Inventor: Marcel Daffue, Veldegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/969,923

(22) Filed: Dec. 15, 2015

(65) Prior Publication Data

US 2016/0176231 A1 Jun. 23, 2016

(30) Foreign Application Priority Data

Dec. 18, 2014 (BE) .............................. BE2014/0850

(51) Int. Cl.
| | |
|---|---|
| *B60B 35/10* | (2006.01) |
| *F16D 1/06* | (2006.01) |
| *F16D 1/12* | (2006.01) |
| *A01B 51/00* | (2006.01) |
| *B60B 35/00* | (2006.01) |
| *B60B 35/14* | (2006.01) |
| *B60G 9/02* | (2006.01) |
| *B60B 35/04* | (2006.01) |

(52) U.S. Cl.
CPC ............ *B60B 35/109* (2013.01); *A01B 51/00* (2013.01); *B60B 35/004* (2013.01); *B60B 35/10* (2013.01); *B60B 35/1045* (2013.01); *B60B 35/1072* (2013.01); *B60B 35/14* (2013.01); *B60G 9/02* (2013.01); *F16D 1/06* (2013.01); *F16D 1/12* (2013.01); *B60B 35/04* (2013.01); *B60B 2900/351* (2013.01); *B60B 2900/551* (2013.01); *B60Y 2200/222* (2013.01)

(58) Field of Classification Search
CPC .............. B60B 35/1072; B60B 35/109; B60B 35/1036; B60B 35/10; B60B 35/1063
See application file for complete search history.

(56) References Cited

U.S. PATENT DOCUMENTS

| | | | | |
|---|---|---|---|---|
| 2,911,229 A | * | 11/1959 | Strehlow | ............... B60B 35/003 180/424 |
| 2,994,546 A | * | 8/1961 | Cooper | ................. B60B 35/003 280/124.113 |
| 3,480,098 A | | 11/1969 | Ward | |
| 4,986,386 A | * | 1/1991 | Iwamoto | ............... B60B 35/001 180/209 |

(Continued)

*Primary Examiner* — James A English
(74) *Attorney, Agent, or Firm* — Patrick M. Sheldrake

(57) ABSTRACT

An agricultural harvester includes a chassis, an axle assembly carrying the chassis, a plurality of hub assemblies including a first hub assembly and a second hub assembly, the hub assemblies coupled to a corresponding end of the axle assembly, and a plurality of ground engaging devices each being coupled to a corresponding hub assemblies. The ground engaging devices support the axle assembly and the chassis. The axle assembly includes an extendable/retractable axle for altering a distance between the ground engaging devices that are coupled to the hub assemblies, and a connecting rod extending/retracting from a central portion of the axle assembly, the connecting rod also coupled to a portion of the first hub assembly. The connecting rod is generally vertically displaced from the extendable/retractable axle.

15 Claims, 4 Drawing Sheets

(56) References Cited

U.S. PATENT DOCUMENTS

| | | | |
|---|---|---|---|
| 5,489,113 A * | 2/1996 | Torborg | B60B 35/003 |
| | | | 180/209 |
| 5,892,124 A | 4/1999 | Olivier et al. | |
| 6,206,125 B1 * | 3/2001 | Weddle | B60B 35/001 |
| | | | 180/209 |
| 6,892,124 B2 * | 5/2005 | Humpal | B60B 35/1054 |
| | | | 280/209 |
| 7,163,227 B1 * | 1/2007 | Burns | B60B 35/1054 |
| | | | 180/906 |
| 7,954,583 B2 | 6/2011 | Coers et al. | |
| 7,963,361 B2 | 6/2011 | Coers et al. | |
| 8,042,817 B2 | 10/2011 | Motebennur et al. | |
| 8,376,078 B2 | 2/2013 | Hiddema | |
| 8,398,179 B2 | 3/2013 | Mackin et al. | |
| 2011/0148053 A1 * | 6/2011 | Motebennur | B60G 9/00 |
| | | | 280/6.16 |
| 2014/0260158 A1 | 9/2014 | Nelson et al. | |

\* cited by examiner

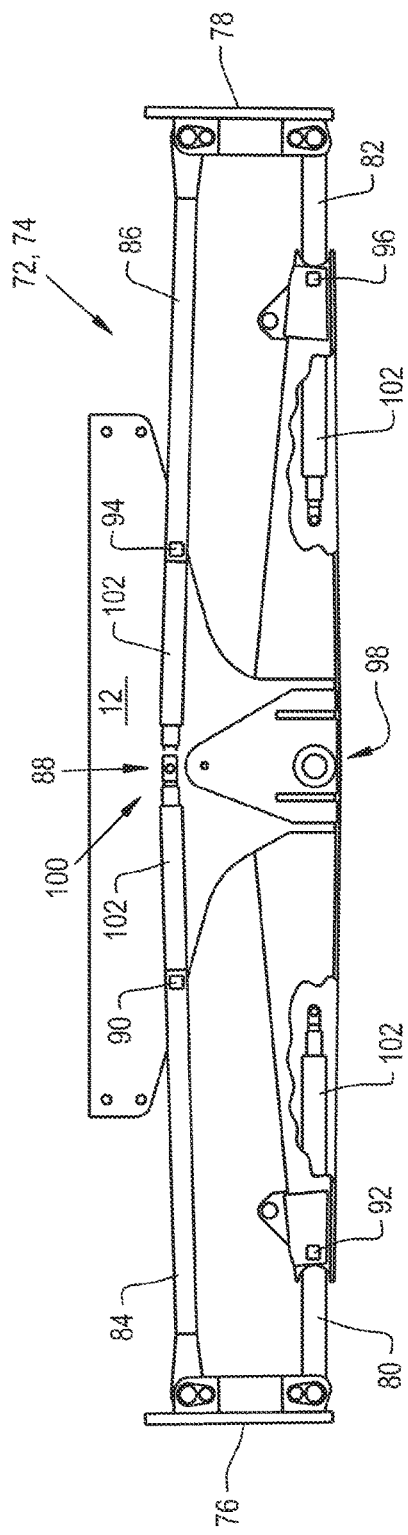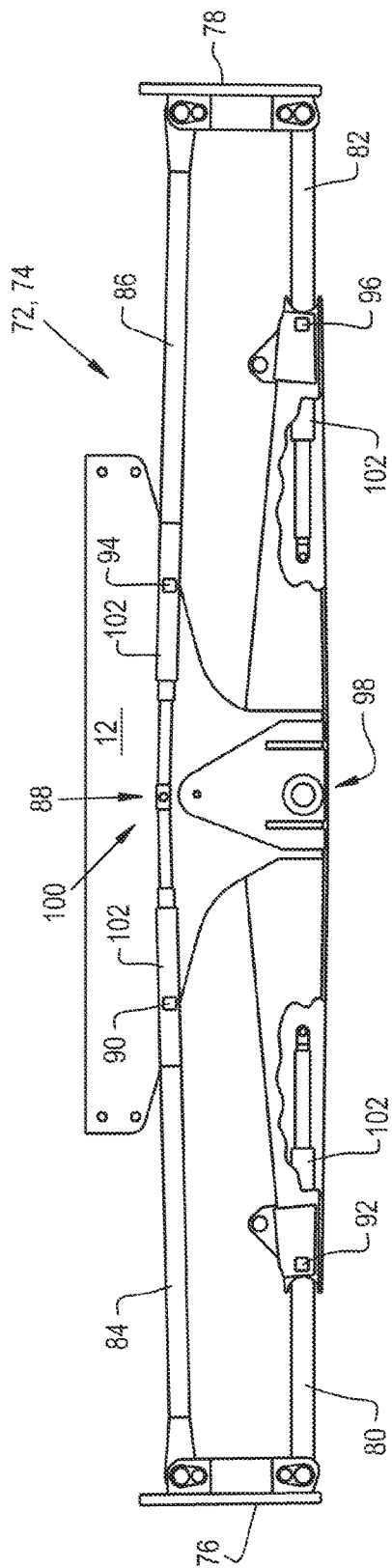

AGRICULTURAL HARVESTER AXLE

This application claims priority to Belgium Application BE2014/0850 filed Dec. 18, 2014, which is incorporated herein by reference in its entirety.

BACKGROUND OF THE INVENTION

The present invention relates to agricultural harvesters, and, more specifically to axle systems for use with agricultural harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

As harvesters increase in size and have longer headers, when on uneven ground the axle system of the harvester can cause the harvester to tilt with the ground and result in less than ideal stability of the harvester on the ground.

What is needed in the art is a cost effective and efficient way to extend axles on an agricultural harvester.

SUMMARY OF THE INVENTION

The present invention provides for a tilting extendable/retractable axle assemblies for an agricultural harvester.

The invention in one form is directed to an agricultural harvester including a chassis, an axle assembly carrying the chassis, a plurality of hub assemblies including a first hub assembly and a second hub assembly, the hub assemblies each being coupled to a corresponding end of the axle assembly, and a plurality of ground engaging devices each being coupled to a corresponding one of the hub assemblies. The ground engaging devices support the axle assembly and the chassis. The axle assembly includes an extendable/retractable axle for altering a distance between the ground engaging devices that are coupled to the hub assemblies, and a connecting rod extending/retracting from a central portion of the axle assembly, the connecting rod being also coupled to a portion of the first hub assembly. The connecting rod being generally vertically displaced from the extendable/retractable axle.

An advantage of the present invention is that it provides for an extended ground profile to enhance stability of the harvester on uneven ground.

Another advantage is that the ground profile of the harvester can be diminished for road transport.

Yet another advantage is that it allows for larger operation angles for the harvester.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a front view of an embodiment of an axle assembly for use on the agricultural harvester of the present invention;

FIG. 3 is another view of the axle assembly of FIG. 2 with the hub assemblies extended;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
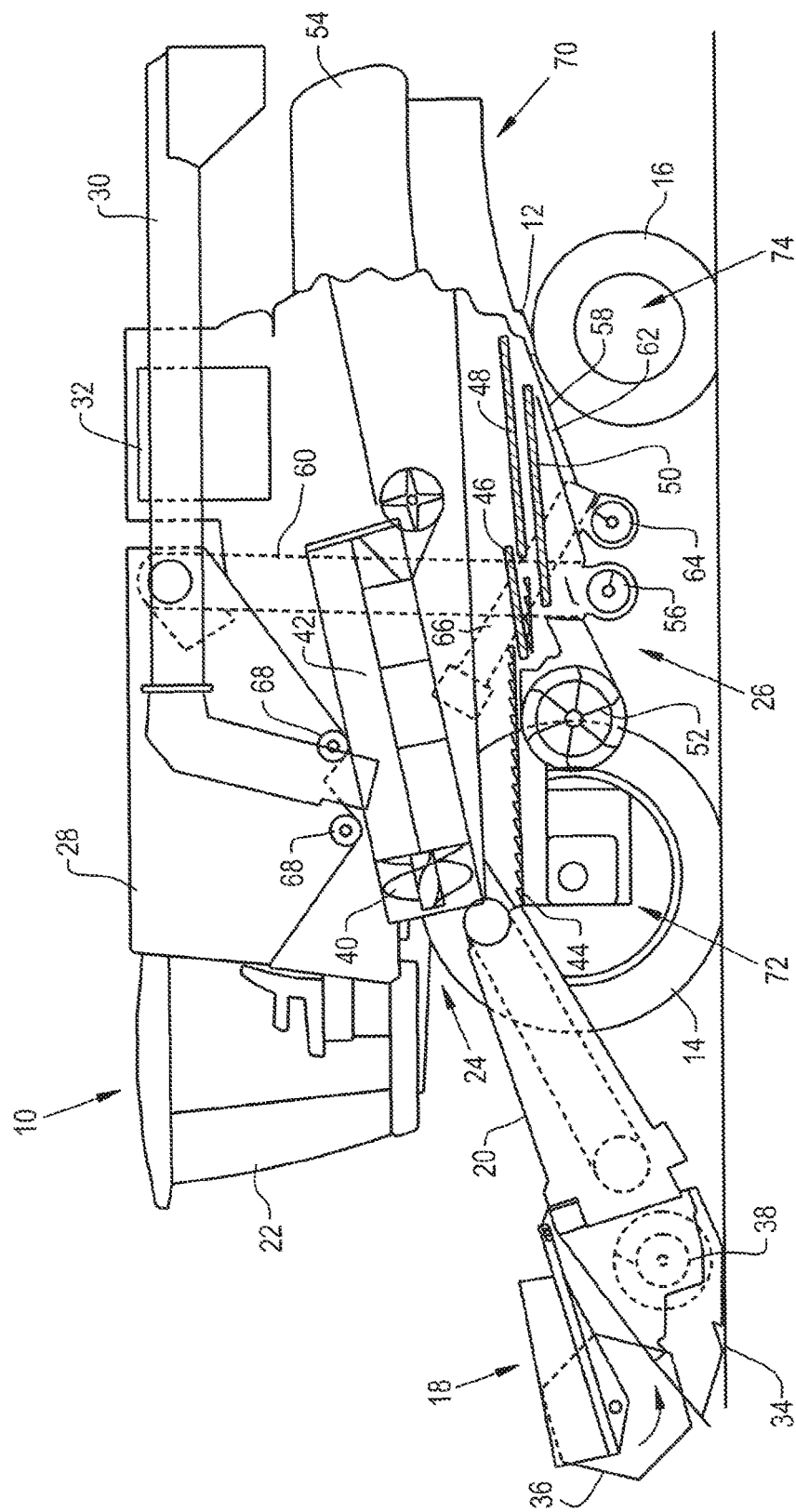
FIG. 1 is a side view of an embodiment of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half tracks.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, it is also contemplated to use the present invention with other conventional threshing systems.

Grain which has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Axle assemblies 72 and 74 carry the chassis 12 and are respectively coupled to the wheels 14 and 16. The axle assemblies 72 and 74 are pivotal with regard to the chassis 12 and, allow for the wheels 14 and 16 to remain in a generally vertical orientation regardless of the tilt of the axle assemblies 72 and 74.

Now, additionally referring to FIGS. 2 and 3 there is shown and illustrated additional details of the axle assemblies 72 and 74, hereafter whatever is discussed about one axle assembly 72 or 74 is generally applicable to the other. The axle assembly 72 includes hub assemblies 76 and 78, extendable/retractable axles 80 and 82, extendable/retractable upper connecting rods 84 and 86, a central area 88, and solenoids 90, 92, 94 and 96. The axle assembly 72 is pivotal about pivot 98 allowing the axle assembly 72 to pivot on uneven ground while keeping the chassis 12 generally level from side-to-side. The upper connecting rods 84 and 86 are pivotally coupled to the chassis 12 at pivot 100, which is generally above pivot 98. It is also contemplated that the connecting rods 84 and 86 can be below the axles 80 and 82, and the connecting rods 84 and 86 can be described as being generally vertically displaced from axles 80 and 82.

For the sake of clarity in the discussion and illustration of the invention the wheels 14 as well as drive components, and details of the hub assemblies 76 and 78 are not included in FIGS. 2-5.

Actuators 102 are situated to cause the synchronized extension or retraction of axles 80 and 82 along with connecting rods 84 and 86. When the agricultural harvester 10 is in a travel mode it is desirable to have wheels 14, more generally ground engaging devices 14, close together as illustrated in FIG. 2. Conversely, when in a field operational mode it may be advantageous to have the hub assemblies 76 and 78, and thus the wheels 14, in an extended position to enhance the stability of the agricultural harvester 10, as shown in FIG. 3.

In transitioning to/from the travel mode or the field operational mode, a sequence of operations take place. First, the solenoids 90, 92, 94 and 96 are activated so that they unlock or disengage from holding the axles 80, 82 and the connecting rods 84, 86 in the particular mode that they are changing from. Next, as the agricultural harvester 10 is moving on the ground, the actuators 102 are activated to cause the movement (either extending or retracting) of the axles 80, 82 and the connecting rods 84, 86. The actuators 102 are sized to be able to effect the transition only as the agricultural harvester 10 is moving. Once axles 80, 82 and connecting rods 84, 86 are in their new position, then solenoids 90, 92, 94 and 96 are altered so that they now lock or engage the axles 80, 82 and connecting rods 84, 86 so that they are locked into position.

Figure 4:
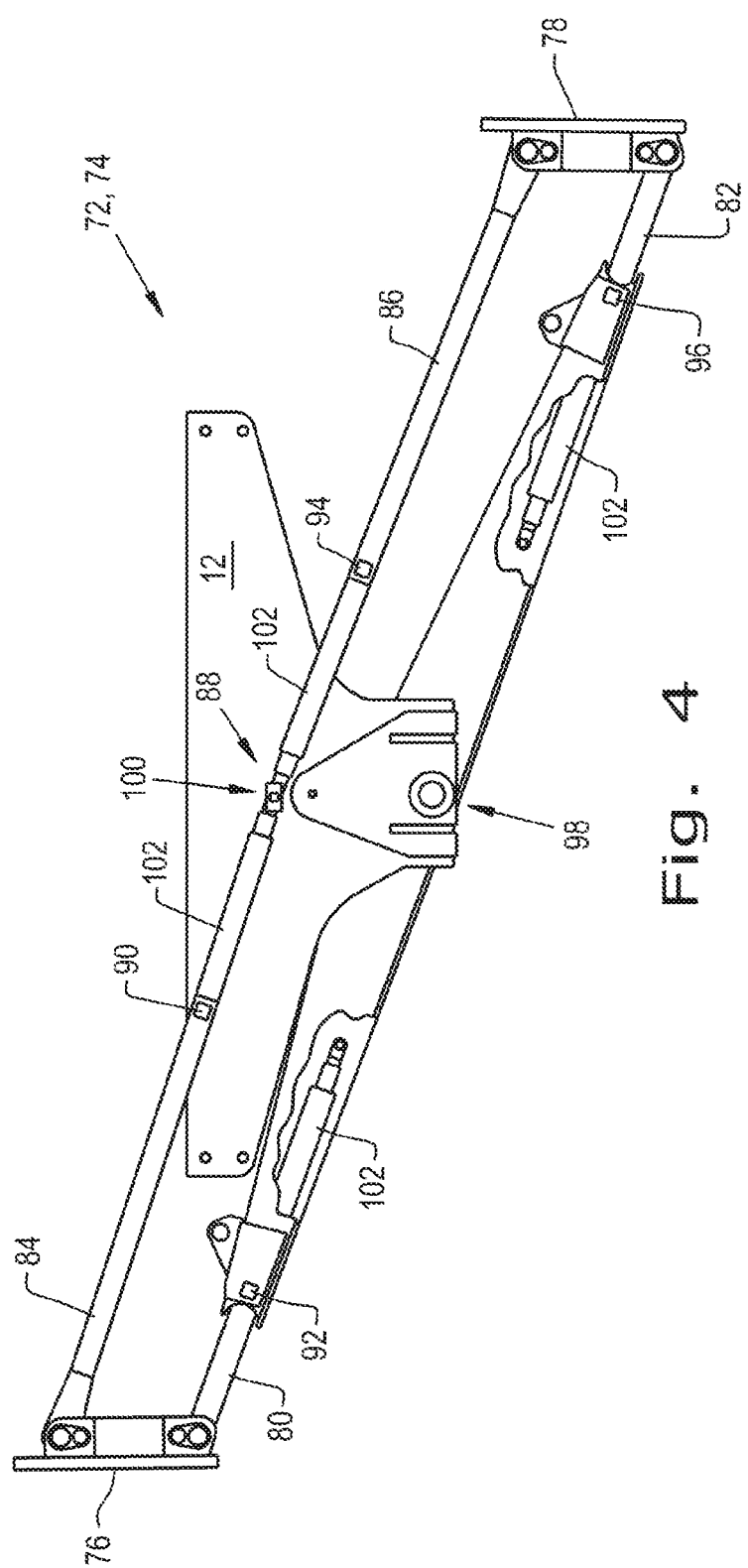
FIG. 4 is another view of the axle assembly of FIGS. 2 and 3 with the hub assemblies retracted and the axle assembly tilted.
Figure 5:
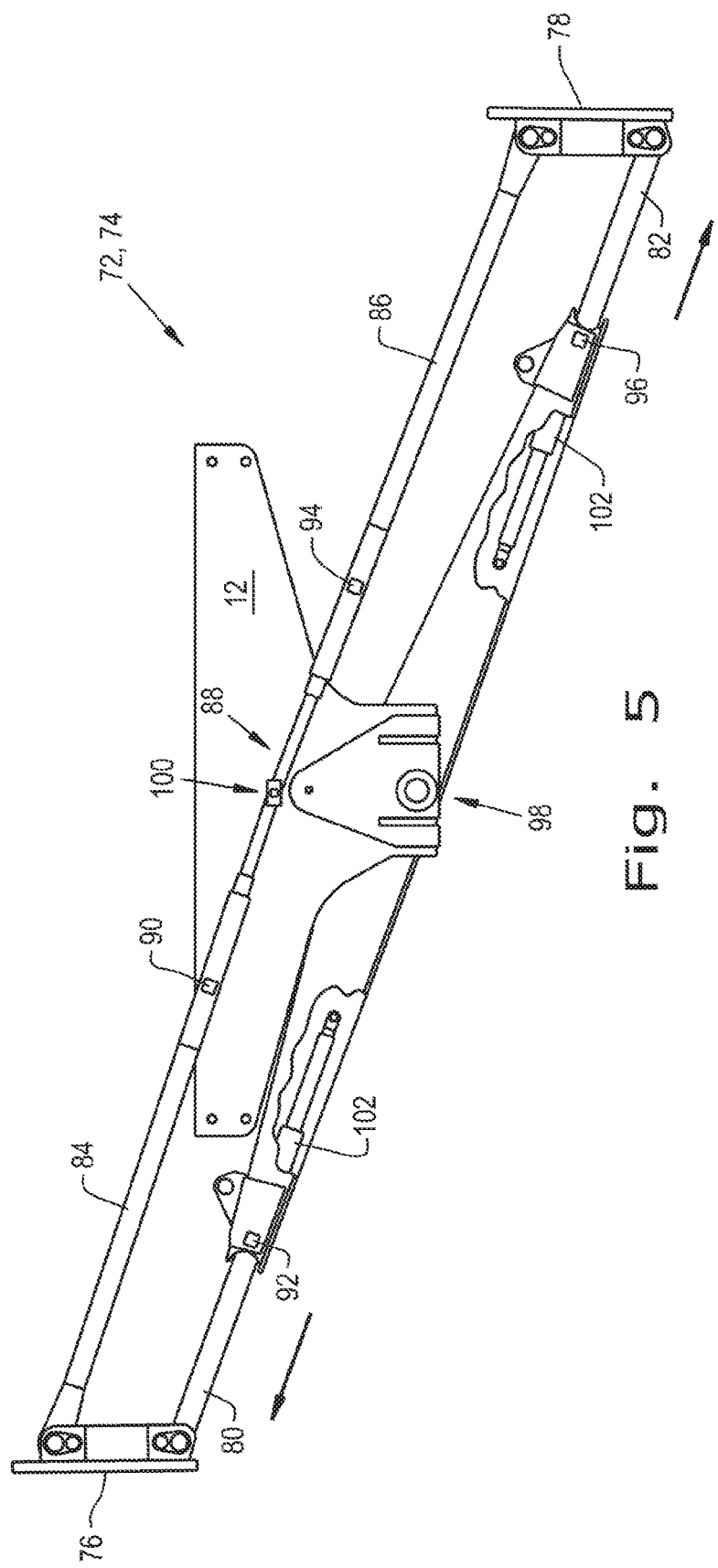
FIG. 5 is yet another view of the axle assembly of FIGS. 2-4 with the axles extended and tilted.

Now, additionally referring to FIGS. 4 and 5 there is shown the axle assembly 72 in an angled orientation in both the retracted and the extended mode. The tilt of the axle assembly 72 corresponds to a ground contour variance that is compensated by keeping the chassis 12 generally level while the axle assembly 72 tilts. The extended mode illustrated in FIG. 5 provides enhanced stability on sloping ground, while the axle assembly 72 keeps the hub assemblies 76 and 78 in a preferred orientation to keep the wheels 14 in a generally vertical orientation.

The present invention builds a telescopic traction axle with an extended or wider wheelbase during field operations to have a positive impact on the machine performance When the harvester 10 is in the field the operator releases the solenoids 90, 92, 94, 96 that unlocks the axle extensions. Then the extension hydraulics are engaged and the axle extends along with stabilizers, which are pushed outwards until the solenoids lock the axle in position when fully extended. As discussed above, due to the weight of the harvester 10, the harvester 10 will typically need to be rolling forward at a slow, steady pace as the actuators 102 extend the axles 80, 82 and connecting rods 84, 86. It is contemplated that intermediate positions between fully retracted and fully extended can also be arranged with the solenoids 90, 92, 94, 96 locking at the intermediate positions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed:

1. An agricultural harvester, comprising:
a chassis;
an axle assembly carrying the chassis;
a plurality of hub assemblies comprising a first hub assembly and a second hub assembly, the hub assemblies each being coupled to an opposite corresponding end of the axle assembly; and
a plurality of ground engaging devices each being coupled to a corresponding one of the hub assemblies, the ground engaging devices supporting the axle assembly and the chassis;
wherein the axle assembly comprises:
an extendable and retractable axle configured for altering a distance between the ground engaging devices that are coupled to the hub assemblies; and
a connecting rod configured to extend and retract from a central portion of the axle assembly, the connecting rod being also coupled to a portion of the first hub assembly, the connecting rod being generally vertically displaced from the axle;
a plurality of actuators configured to coordinate the extension and retraction of the extendable and retractable axle and connecting rod altering the lateral distance between the ground engaging devices;
wherein the extendable and retractable axle is pivotal about a first pivot with respect to the chassis and the connecting rod is pivotal about a second pivot with respect to the chassis.

2. The agricultural harvester of claim 1, wherein the extension and retraction of the axle is configured to be coordinated with the extension and retraction of the connecting rod to keep the first hub assembly in a preferred orientation.

3. The agricultural harvester of claim 1, wherein the second pivot is above the first pivot.

4. The agricultural harvester of claim 1, further comprising a plurality of solenoids including a first solenoid coupled with the connecting rod and a second solenoid coupled with the axle, the plurality of solenoids are configured for locking and unlocking movement of the connecting rod and the axle.

5. The agricultural harvester of claim 4, wherein the axle and the connecting rod are configured to extend or retract only while the agricultural harvester is moving.

6. The agricultural harvester of claim 4, wherein the axle assembly further comprises:
a second extendable and retractable axle that operates in a direction opposite to the axle; and
a second connecting rod that operates in a direction generally opposite to the connecting rod, the plurality of solenoids also including a third solenoid coupled with the other connecting rod and a fourth solenoid coupled with the axle.

7. The agricultural harvester of claim 6, wherein the axle assembly is configured to extend by first unlocking the plurality of solenoids, activating the plurality of actuators as the agricultural harvester is moving, then upon the full extension of the axles and the connecting rods, the solenoids then lock the axles and the connecting rods.

8. The agricultural harvester of claim 6, wherein the axle assembly is configured to retract by first unlocking the plurality of solenoids, activating the plurality of actuators as the agricultural harvester is moving, then upon the full retraction of the axles and the connecting rods the solenoids lock the axles and the connecting rods.

9. The agricultural harvester of claim 1, wherein the connecting rod is above the axle.

10. An axle assembly for use on an agricultural harvester having a chassis, the axle assembly being coupled to the chassis, the axle assembly comprising:
a plurality of hub assemblies including a first hub assembly and a second hub assembly;
an extendable and retractable axle having the first hub assembly coupled thereto, the axle connected to a first actuator configured to control an extension length of the axle to alter a distance between the hub assemblies; and
a connecting rod connected to a second actuator configured to extend and retract the connecting rod from a central portion of the axle assembly controlling an extension length of the connecting rod, the connecting rod being also coupled to a portion of the first hub assembly, the connecting rod being generally vertically displaced from the axle the first and second actuators configured to coordinate the extension and retraction of the axle and the connecting rod to keep the first hub assembly in a preferred orientation.

11. The axle assembly of claim 10, wherein the axle assembly is pivotal about a first pivot with respect to the chassis.

12. The axle assembly of claim 11, wherein the connecting rod is pivotal about a second pivot with respect to the chassis.

13. The axle assembly of claim 12, wherein the second pivot is above the first pivot.

14. The axle assembly of claim 10, further comprising a plurality of solenoids including a first solenoid coupled with the connecting rod and a second solenoid coupled with the axle, the plurality of solenoids are configured to lock and unlock the movement of the connecting rod and the axle.

15. The axle assembly of claim 10, wherein the connecting rod is above the axle.

\* \* \* \* \*